United States Patent
Shimizu et al.

(10) Patent No.: US 6,217,225 B1
(45) Date of Patent: Apr. 17, 2001

(54) WHEEL SUPPORTING DEVICE AND TAPERED ROLLER BEARING

(75) Inventors: Yasuhiko Shimizu; Junichi Hattori, both of Mie; Hiroyuki Ichikawa, Shizuoka; Takashi Tsujimoto, Mie, all of (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/320,734

(22) Filed: May 27, 1999

(30) Foreign Application Priority Data

May 29, 1998 (JP) .................................................. 10-148841

(51) Int. Cl.[7] .................................................. F16C 33/78
(52) U.S. Cl. ............................................ 384/589; 384/486
(58) Field of Search .................... 301/105.1; 384/589, 384/571, 477, 481, 482, 483, 484, 485, 486

(56) References Cited

U.S. PATENT DOCUMENTS

| 4,339,374 | * | 7/1982 | Olschewski et al. ............ 384/576 X |
| 4,799,808 | * | 1/1989 | Otto ..................................... 384/481 |
| 5,553,870 | * | 9/1996 | Czekansky et al. ............. 384/486 X |

* cited by examiner

Primary Examiner—Thomas R. Hannon
(74) Attorney, Agent, or Firm—Wenderoth, Lind & Ponack. L.L.P.

(57) ABSTRACT

A wheel support device which is easy to assemble and compact in size. A pair of tapered roller bearings are mounted on the outer periphery of an axle. The pair of tapered roller bearings rotatably support an axle hub that rotates together with a wheel. A seal assembly is mounted between the outer and inner rings of one of the tapered roller bearings. The seal assembly prevents leakage of grease sealed in the axle hub and entry of muddy water from outside, and makes it unnecessary to provide a separate seal member, thus making it possible to assemble the wheel support device easily and to reduce its size.

11 Claims, 2 Drawing Sheets

WHEEL SUPPORTING DEVICE AND TAPERED ROLLER BEARING

BACKGROUND OF THE INVENTION

This invention relates to wheel supporting devices for rotatably supporting wheels of passenger cars and trucks, and tapered roller bearings for supporting wheels.

A conventional wheel support device for supporting a non-driven vehicle wheel, e.g. a front wheel of a rear-wheel drive vehicle, comprises an axle (or knuckle spindle) carried by a steering knuckle, two rolling bearings mounted on the axle, and an axle hub rotatably supported by the rolling bearings and having a flange. A brake drum of a brake device and a wheel disk are mounted on the axle hub by stud bolts fixed to the flange and nuts threaded onto the stud bolts.

A back plate mounted on a flange of the steering knuckle supports a braking mechanism for applying braking force to the brake drum.

Tapered roller bearings are typically used in such wheel support devices to rotatably support the axle hub because this type of bearings are large in load capacity and high in rigidity. Tapered roller bearings are lubricated by grease sealed between the axle and the axle hub.

If grease leaks out, the tapered roller bearing may seize due to poor lubrication. If leaked grease enters the brake drum, the brake will fail, thus creating a serious safety problem. Thus, conventional wheel support devices have seal means for preventing leakage of grease, or a grease cap mounted on the outer end of the axle hub.

Such a conventional wheel support device is disclosed in Japanese utility model publication 58-85505. This device has a seal mechanism mounted between the axle and the axle hub at the inner side of a tapered roller bearing supporting the inner end of the axle hub. This needs an extra length for installation of the seal on the axle hub. This adds to the size of the entire wheel support device.

Also, since the seal mechanism uses the outer periphery of the axle as its sealing surface, it is necessary to finish the outer periphery of the axle to high accuracy. Machining of the axle is thus troublesome.

Handling of the tapered roller bearings is difficult because they are separable type roller bearings. Since a separate seal mechanism is needed besides the tapered roller bearings, assembling of the wheel support device is troublesome.

An object of this invention is to provide a wheel support device which is compact in size and easy to assemble and machine.

Another object of this invention is to provide a wheel-supporting tapered roller bearing that is easy to handle.

SUMMARY OF THE INVENTION

According to this invention, there is provided a wheel support device having an axle, a rotary member that rotates together with a wheel, roller bearings mounted on the outer surface of the axle for rotatably supporting the rotary member, the roller bearings comprising tapered roller bearings each comprising an outer ring, an inner ring, a cage mounted between the outer ring and the inner ring, tapered rollers held by the cage, and a seal means mounted between the outer and inner rings at the large-diameter end of the tapered rollers, the seal means comprising a slinger mounted to the inner ring, a metal core mounted to the outer ring, and a resilient seal fixed to the core and having sealing lips resiliently pressed against the inner surface of the slinger, the seal means holding the outer and inner rings unseparable from each other.

The rotary member may be an axle hub.

Since the tapered roller bearing has a built-in seal means, no separate seal mechanism is needed, so that the wheel supporting device can be assembled easily. Also, it is possible to reduce its size.

To reduce the manufacturing cost, the cage of the tapered roller bearing is preferably made from a synthetic resin, such as polyamide resin, because synthetic resin is easily moldable. For higher strength, the cage may be made from a polyamide resin reinforced with glass fiber.

The resilient seal of the seal means may be made up of a side lip resiliently pressed against the inner surface of the slinger, and inner and outer lips resiliently pressed against the outer periphery of the cylindrical portion of the slinger pressed onto the inner ring to effectively prevent leakage of grease and entry of muddy water. A garter spring may be put around the outer lip of the resilient seal to press the outer lip more tightly against the cylindrical portion, thereby more effectively preventing leakage of grease and entry of muddy water.

According to the second invention, there is also provided a tapered roller bearing comprising an outer ring, an inner ring, a cage mounted between the outer and inner rings, tapered rollers held by the cage, and a seal means mounted between the outer and inner rings at the large-diameter end of the tapered rollers, the seal means comprising a slinger mounted on the inner ring, a metal core mounted in the outer ring, and a resilient seal fixed to the metal core and having sealing lips resiliently pressed against the inner surface of the slinger, the outer and inner rings being held unseparable from each other by the seal means.

This tapered roller bearing is easy to handle because the inner and outer rings are unseparable.

Other features and objects of the present invention will become apparent from the following description made with reference to the accompanying drawings, in which:

DETAILED DESCRIPTION OF THE PREFERRED EMBODIMENT

Figure 1:
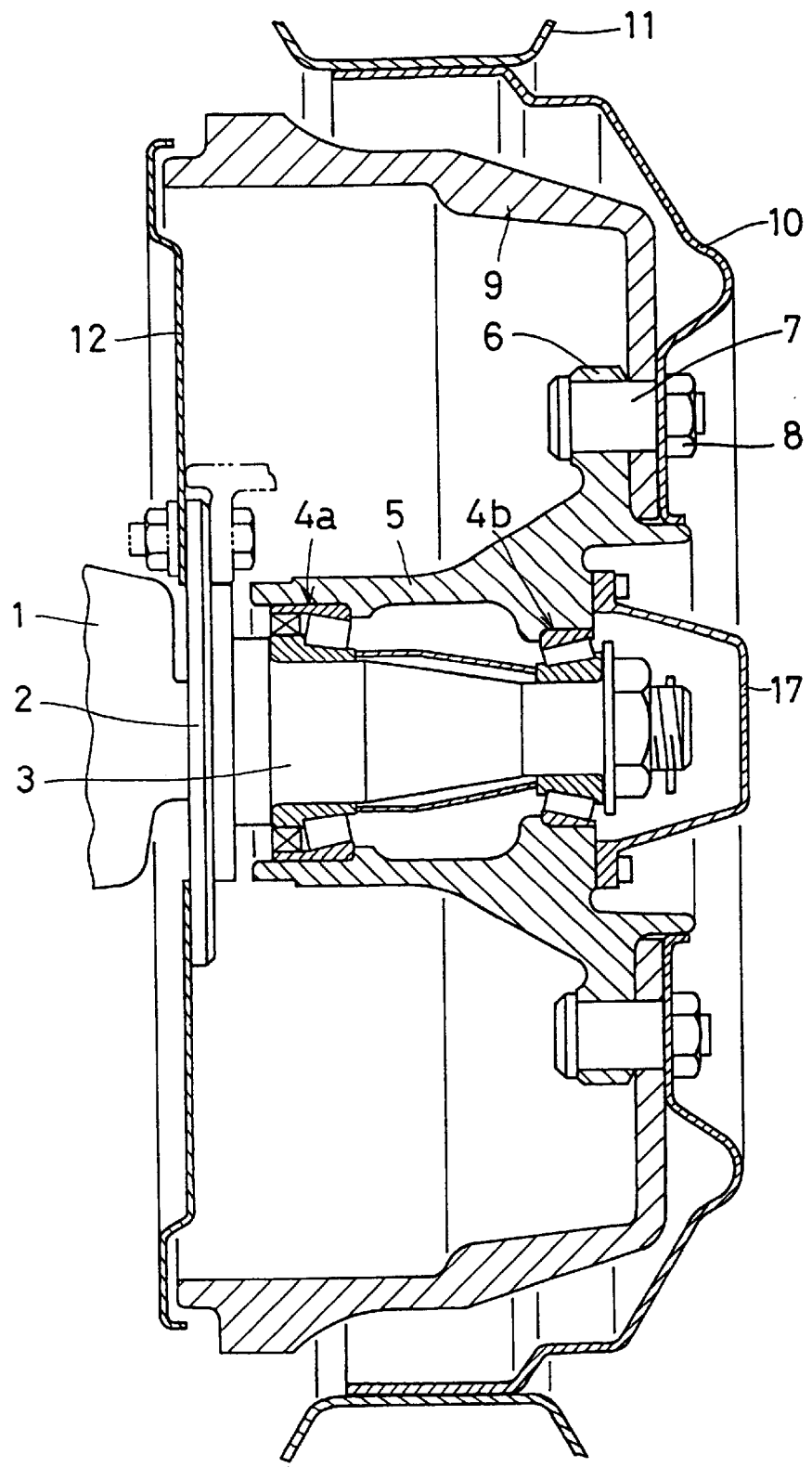
FIG. 1 is a vertical sectional front view of a wheel support device embodying this invention.

An embodiment of this invention is now described with reference to the drawings. As shown in FIG. 1, a steering knuckle 1 has a flange 2 and carries an axle 3. An axle hub 5 as a rotary member is rotatably supported by a pair of tapered roller bearings 4a, 4b mounted on the axle 3.

The axle hub 5 has a flange 6 on its outer periphery. A brake drum 9 of a brake assembly and a wheel disk 10 are mounted to the axle hub 5 by stud bolts 7 secured to the flange 6 and nuts 8 threaded onto the bolts 7. A tire-carrying rim 11 is mounted on the outer periphery of the wheel disk 10.

A back plate 12 of the brake assembly is mounted to the flange 2 of the steering knuckle 1 by bolts and nuts. The back plate 12 supports an unillustrated braking mechanism for applying braking force to the brake drum 9.

The pair of tapered roller bearings 4a, 4b rotatably supporting the axle hub 5 are lubricated by grease sealed in the axle hub 5.

Figure 2:
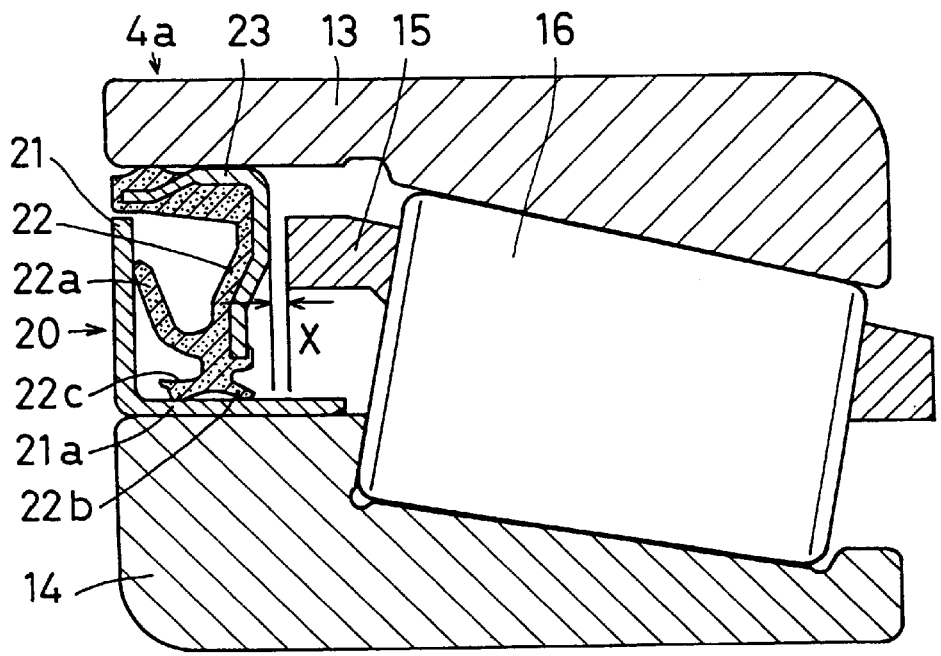
FIG. 2 is a sectional view of a tapered roller bearing used in the device of FIG. 1.

FIG. 2 shows the tapered roller bearing 4a supporting the inner end of the axle hub 5. The tapered roller bearing 4a comprises an outer ring 13, an inner ring 14, a cage 15 disposed between the rings, tapered rollers 16 retained by the cage 15, and a seal means 20 provided at the large-diameter end of the tapered rollers 16.

The cage 15 is formed by molding a synthetic resin comprising a polyamide resin and 25% by weight of glass fiber.

The seal means 20 comprises a slinger 21 fitted on the outer periphery of the inner ring 14, and a resilient seal 22 mounted on the inner periphery of the outer ring 13.

The slinger 21 has a cylindrical portion 21a pressed onto the inner ring 14. The resilient seal 22 is baked or otherwise fixed to a metal core 23 having an L-shaped section and pressed into the outer ring 13. The resilient seal 22 includes a side lip 22a resiliently pressed against the inner side surface of the slinger 21, and an inner lip 22b and an outer lip 22c resiliently pressed against the outer periphery of the cylindrical portion 21a of the slinger 21. The metal core 23 is disposed opposite an end face of the cage 15 via a gap.

In this arrangement, by suitably setting the gap X between the metal core 23 of the seal means 20 and the cage 15, the outer ring 13 and the inner ring 14 are kept unseparable from each other.

The tapered roller bearing 4b supporting the outer end of the axle hub 5 is similar to the roller bearing 4a but has no seal means 20 such as shown in FIG. 2. Instead, a grease cap 17 is put on the outer end of the axle hub 5 so as to cover the tapered roller bearing 4b to prevent leakage of grease through the roller bearing 4b or entry of muddy water from outside.

The seal means 20 of the tapered roller bearing 4a prevents grease in the axle hub 5 from leaking into the brake drum 9 and also prevents entry of muddy water from outside, thereby preventing brake trouble and insuring long bearing life.

The seal means 20 further eliminates the necessity for a conventional seal means provided between the tapered roller bearing 4a and the flange 2 of the steering knuckle 1. This makes it possible to shorten the axial length of the axle hub 5, and thus to reduce the size of the entire wheel support device, and also makes it easier to assemble the wheel support device.

Since the resilient seal 22 of the seal means 20 is simple in structure with its lips 22a, 22b, 22c simply pressed against the slinger 21, the seal means 20 can be manufactured at a low cost. Since the outer ring 13 and the inner ring 14 can be unseparably held together by suitably setting the gap X between the core 23 of the seal means 20 and the cage 15, handling of the tapered roller bearing 4a is easy.

Figure 3:
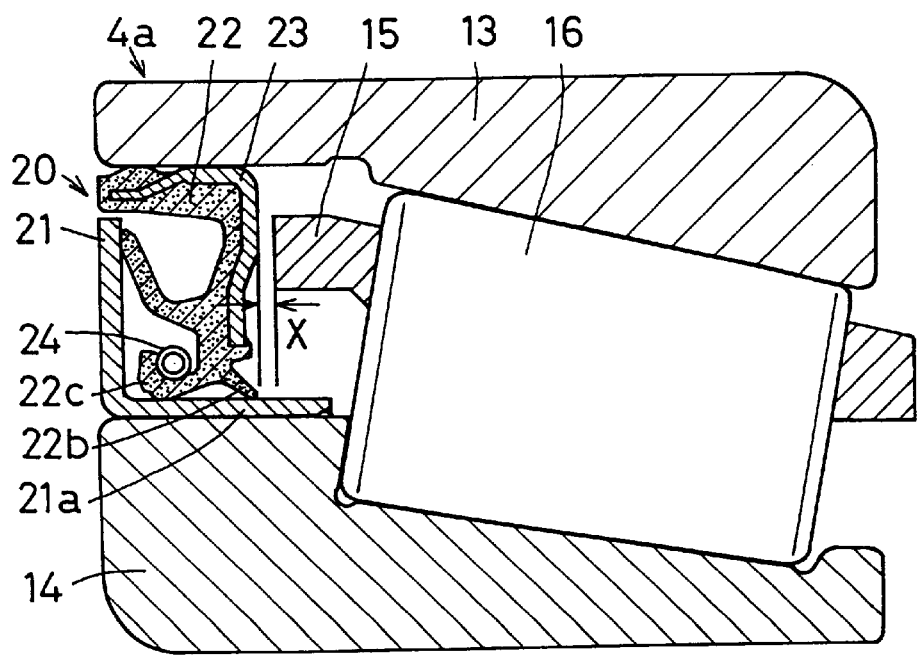
FIG. 3 is a sectional view of a different type of tapered roller bearing.

As shown in FIG. 3, a garter spring 24 may be wound around the outer lip 22c of the resilient seal 22 to press the lip 22c more tightly against the outer periphery of the cylindrical portion 21a of the slinger 21, thereby more positively preventing leakage of grease and entry of muddy water.

In the preferred embodiment, although the outer end of the axle hub 5 is rotatably supported by the tapered roller bearing 4b having no seal, it may supported by a tapered roller bearing having a seal means mounted therein.

Since the axle hub is supported by a tapered roller bearing having a built-in seal means, there is no need to provide a separate seal outside the bearing. This makes it possible to reduce the size of the wheel support device and makes it easy to assemble it.

Since the tapered roller bearing is made unseparable by mounting the seal means therein, it is easy to handle. Since the seal is made up of only the slinger and the resilient seal and thus simple in structure, it can be manufactured at a low cost. Since the lips of the resilient seal are not pressed against the axle, it is not necessary to finish the outer periphery of the axle to high accuracy, so that machining of the axle is easy.

What is claimed is:

1. A wheel support device having an axle, a rotary member that rotates together with a wheel, roller bearings mounted on the outer surface of the axle for rotatably supporting the rotary member, said roller bearings comprising tapered roller bearings each comprising an outer ring, an inner ring, a cage mounted between said outer ring and said inner ring, tapered rollers held by said cage, and a seal device mounted between said outer and inner rings at the large-diameter end of said tapered rollers, said seal device comprising a slinger mounted to said inner ring, a metal core mounted to said outer ring, and a resilient seal fixed to said core and having sealing lips resiliently pressed against the inner surface of said slinger, wherein said metal core is disposed opposite an end face of said cage via a gap to prevent said outer and inner rings from separating from each other.

2. The device as claimed in claim 1 wherein said rotary member is an axle hub.

3. The device as claimed in claim 2 wherein said cage is made of a synthetic resin.

4. The device as claimed in claim 2 wherein said slinger has a cylindrical portion and an inner side surface, and said sealing lips comprise a side lip resiliently pressed against the inner side surface of the slinger, and an inner lip and an outer lip resiliently pressed against the outer periphery of the cylindrical portion of the slinger pressed onto the inner ring.

5. The device as claimed in claim 1 wherein said cage is made of a synthetic resin.

6. The device as claimed in claim 5 wherein said slinger has a cylindrical portion and an inner side surface, and said sealing lips comprise a side lip resiliently pressed against the inner side surface of the slinger, and an inner lip and an outer lip resiliently pressed against the outer periphery of the cylindrical portion of the slinger pressed onto the inner ring.

7. The device as claimed in claim 5 wherein said synthetic resin comprises a polyamide resin and glass fiber.

8. The device as claimed in claim 7 wherein said slinger has a cylindrical portion and an inner side surface, and said sealing lips comprise a side lip resiliently pressed against the inner side surface of the slinger, and an inner lip and an outer lip resiliently pressed against the outer periphery of the cylindrical portion of the slinger pressed onto the inner ring.

9. The device as claimed in claim 1 wherein said slinger has a cylindrical portion and an inner side surface, and said sealing lips comprise a side lip resiliently pressed against the inner side surface of the slinger, and an inner lip and an outer lip resiliently pressed against the outer periphery of the cylindrical portion of the slinger pressed onto the inner ring.

10. The device as claimed in claim 9 wherein said seal device further comprises a garter spring provided about said outer lip to tighten said outer lip against the outer periphery of the cylindrical portion of the slinger.

11. A tapered roller bearing comprising an outer ring, an inner ring, a cage mounted between said outer and inner rings, tapered rollers held by said cage, and a seal device mounted between said outer and inner rings at the large-diameter end of said tapered rollers, said seal device comprising a slinger mounted on said inner ring, a metal core mounted in said outer ring, and a resilient seal fixed to said metal core and having sealing lips resiliently pressed against the inner surface of said slinger, wherein said metal core is disposed opposite an end face of said cage via a gap to prevent said outer and inner rings from separating from each other.

\* \* \* \* \*